(12) United States Patent
Chabaille et al.

(10) Patent No.: US 10,563,586 B2
(45) Date of Patent: Feb. 18, 2020

(54) FUEL INJECTOR FOR A TURBINE ENGINE

(71) Applicant: Snecma, Paris (FR)

(72) Inventors: Christophe Chabaille, Moissy Cramayel (FR); Sébastien Loval, Moissy Cramayel (FR)

(73) Assignee: Safran Aircraft Engines, Paris (FR)

( * ) Notice: Subject to any disclaimer, the term of this patent is extended or adjusted under 35 U.S.C. 154(b) by 908 days.

(21) Appl. No.: 15/026,082

(22) PCT Filed: Sep. 24, 2014

(86) PCT No.: PCT/FR2014/052385
§ 371 (c)(1),
(2) Date: Mar. 30, 2016

(87) PCT Pub. No.: WO2015/049438
PCT Pub. Date: Apr. 9, 2015

(65) Prior Publication Data
US 2016/0237911 A1    Aug. 18, 2016

(30) Foreign Application Priority Data

Oct. 1, 2013 (FR) ..................... 13 59516

(51) Int. Cl.
*F02C 7/22* (2006.01)
*F23R 3/28* (2006.01)

(52) U.S. Cl.
CPC ................ *F02C 7/22* (2013.01); *F23R 3/28* (2013.01); *F05D 2220/32* (2013.01)

(58) Field of Classification Search
CPC .. F02C 7/22; F02C 7/222; F02C 7/232; F02C 7/2365; F23R 3/343; F23R 3/34; F23R 3/286; F23R 3/28; F23R 3/283; F23D 11/38; F23D 2900/11101; F16L 15/02; F02M 55/008; F02M 43/04; F02M 61/1826
USPC ........................... 60/740, 742, 743
See application file for complete search history.

(56) References Cited

U.S. PATENT DOCUMENTS

| | | | | |
|---|---|---|---|---|
| 2,703,260 A * | 3/1955 | Olson | .................. | F23D 11/383 239/404 |
| 3,013,732 A * | 12/1961 | Webster | .................. | B05B 7/04 239/404 |
| 3,039,701 A * | 6/1962 | Carlisle | ................ | F23D 11/383 239/404 |
| 4,491,272 A * | 1/1985 | Bradley | ................ | F23D 11/26 239/104 |

(Continued)

FOREIGN PATENT DOCUMENTS

| CN | 102782411 A | 11/2012 |
|---|---|---|
| FR | 2 958 015 A1 | 9/2011 |
| WO | WO 2013/045011 A1 | 4/2013 |

*Primary Examiner* — Jason H Duger
(74) *Attorney, Agent, or Firm* — Blank Rome LLP

(57) ABSTRACT

A fuel injector (10) such as an injector for an annular combustion chamber of a turbine engine, comprising a downstream head (16) having a central outlet (22) and an annular peripheral outlet (24) surrounding the central outlet (22), and an injector arm (12) upstream of the head (16) comprising coaxial central channel (18) and annular channel (20), characterised in that the central channel (18) is in fluid communication with the peripheral outlet (24) and the annular channel (20) is in fluid communication with the central outlet (22).

9 Claims, 2 Drawing Sheets

(56) References Cited

U.S. PATENT DOCUMENTS

| | | | |
|---|---|---|---|
| 6,276,141 B1* | 8/2001 | Pelletier | F23D 11/107 60/740 |
| 6,289,676 B1* | 9/2001 | Prociw | B05B 1/3489 60/740 |
| 9,303,876 B2 | 4/2016 | Hernandez et al. | |
| 9,400,104 B2* | 7/2016 | Low | F23R 3/28 |
| 2007/0068164 A1 | 3/2007 | Hernandez et al. | |

* cited by examiner

FUEL INJECTOR FOR A TURBINE ENGINE

The present invention relates to a fuel injector for an annular combustion chamber of a turbine engine such as a turbojet or a turboprop engine.

In a known manner, a turbine engine includes an annular combustion chamber arranged at the outlet of a high pressure compressor and provided with a plurality of fuel injectors regularly distributed circumferentially, at the entrance of the combustion chamber. Each fuel injector comprises an arm extending from an annular external casing surrounding the combustion chamber and having an injector head at its downstream end.

In this type of injector, an annular channel externally surrounds a central channel to the fuel outlet in the combustion chamber. The central channel is provided for the continuous circulation of fuel and the annular channel is provided for the intermittent circulation of fuel during the special aircraft flight phases requiring extra fuel intake.

The terms upstream and downstream refer to the relative positions of elements relative to each other with respect to the fluid circulation in the downstream direction in the fuel injector.

The central channel thus forms a so-called fuel primary flow circuit and the annular channel thus forms a fuel secondary flow circuit.

However, intermittently using the secondary circuit has the major drawback of causing, because of the high temperatures due to the flame radiation in the combustion chamber, a coking of the fuel stagnating inside the secondary circuit when the latter is broken. Coking of the fuel stagnating in the secondary circuit which might block the circulation of fuel in the secondary circuit may result. This problem is particularly significant in the injector arm area.

To reduce this risk of coking, a heat shield can be provided around the arm of the injector. However, this solution results in an increase in the mass of each injector and thus of the turbine engine, leading to an increase in the fuel consumption.

The invention more particularly aims at providing a simple, efficient and cost-effective solution to this problem.

To this end, it provides for a fuel injector such as an injector for an annular combustion chamber of a turbine engine, comprising a downstream head having a central outlet and an annular peripheral outlet surrounding the central outlet, and an injector arm upstream of the head comprising coaxial central channel and annular channel, characterised in that the central channel is in fluid communication with the peripheral outlet and the annular channel is in fluid communication with the central outlet.

According to the invention, the peripheral fuel outlet surrounding the central outlet and intended to operate only intermittently is supplied with fuel by a central channel of the arm of the injector, which channel is surrounded by an annular channel inside which fuel continuously flows to supply the central outlet of the head of the injector. Thus, the central channel of the arm is protected by the annular channel, which prevents coking of the fuel therein.

The invention avoids using additional thermal protection means of the arm which are heavy and bulky, which simplifies the production of the injector and reduces the manufacturing cost thereof.

Eventually, the assembling and disassembling of the injector are also simplified since thermal protection means are no longer required.

According to another characteristic of the invention, the downstream ends of the central channel and the annular channel of the arm communicate, respectively, with at least a first duct communicating downstream with the peripheral outlet and at least a second duct communicating downstream with the central outlet, with said first and second ducts being formed in an annular body arranged at the junction of the head and the arm.

The first and second channels provide a reversed fuel flow in the head of the injector so that the fuel circulating in the annular channel of the arm travels in the central outlet and the fuel in the central channel of the arm flows out of the head of the injector through the peripheral outlet surrounding the central outlet.

The annular body is preferably formed in one piece, which facilitates the integration thereof at the junction of the injector head and the arm thereof.

In one embodiment of the invention, the downstream end of the first duct opens into an annular channel of the head of the injector internally and externally delimited by two internal and external annular coaxial tips respectively, with the downstream end of the second duct opening into the internal tip.

Still according to another characteristic of the invention, the annular body comprises an upstream central opening communicating the upstream end of the first duct with the downstream end of the annular channel of the arm and a downstream central opening communicating the downstream end of the second duct with the annular channel of the head of the injector.

In a special configuration of integration of the annular body in the injector, the upstream end of the internal tip is sealingly inserted into a tubular passage forming the downstream central opening of the body and the upstream end of the external tip sealingly surrounds the downstream end of the external peripheral annular body.

The upstream central opening of the body is preferably formed by a tubular portion projecting in the upstream direction relative to a downstream annular portion of the body, with the tubular portion being sealingly fitted around or inside the downstream end of a tube forming the central channel of the arm.

Advantageously, the injector comprises a plurality of first and second ducts alternately arranged around an axis passing through the central openings upstream and downstream of the annular body.

The invention also relates to a combustion chamber comprising at least one injector of the type described above.

The invention also relates to a turbine engine, such as a turbojet or a turboprop in an airplane, comprising a combustion chamber of the type described in the preceding paragraph.

Eventually, the invention relates to an annular body comprising a first and a second central opening at each one of its first and second ends and a plurality of first and second ducts alternately arranged around an axis (X) passing through the two central openings of the annular body so that the first ducts open at the ends of the body in the first central opening of the body and around the second central opening and so that the second ducts open at the ends of the body in the second central opening of the body and around the first central opening.

According to another characteristic, said first central opening is formed by a projecting tubular portion and the second central opening is formed by a tubular passage of the annular body.

The invention will be better understood, and other details, characteristics and advantages of the invention will appear upon reading the following description given by way of a non restrictive example while referring to the appended drawings wherein.

Figure 1:
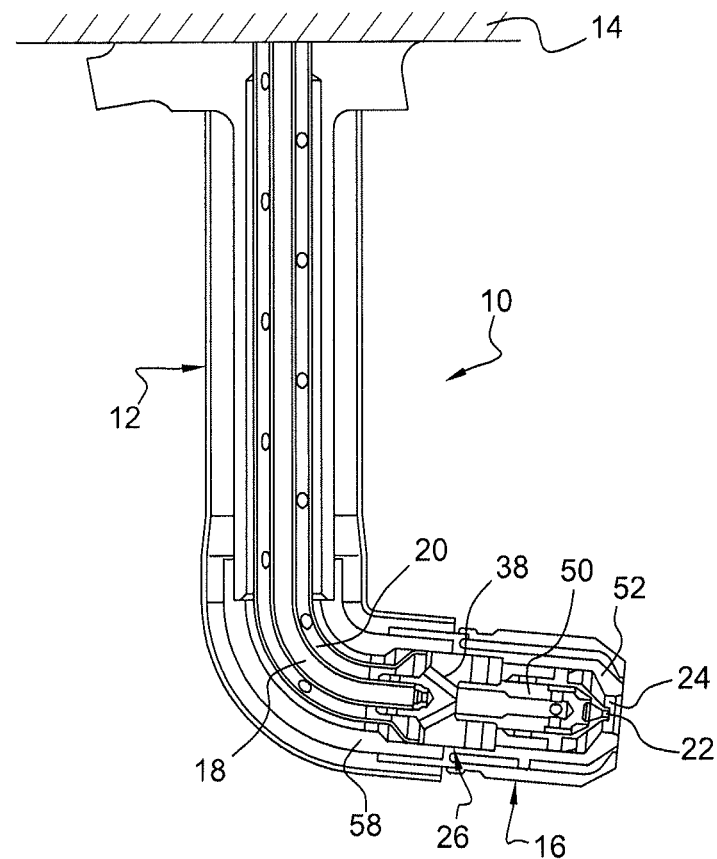
FIG. 1 is a schematic axial sectional view of an injector according to the invention.

Reference is first made to FIG. 1 showing a fuel injector 10 according to the invention formed by an injector arm 12 externally carried by a housing 14 surrounding a combustion chamber. The injector arm 12 includes at its downstream end an injector head 16 opening into the combustion chamber. This type of arrangement of an injector 10 inside a housing 14 and a combustion chamber is well known to the persons skilled in the art and will not be described in greater detail, with the characteristics of the invention relating to the injector 10 as such. However, the invention also relates to a combustion chamber comprising such an injector 10.

The injector arm 12 has a L-bent shape and comprises a central channel 18 and an annular channel 20 externally surrounding the central channel 18. The downstream head 16 of the injector 10 includes a fuel central outlet 22 and a peripheral outlet 24 surrounding the central outlet 22.

In the prior art (not shown), the central channel 18 of the arm 12 of the injector 10 is in fluid communication with the central outlet 22 and forms the primary fuel circulation circuit continuously feeding the combustion chamber. The annular channel 20 is in fluid communication with the peripheral outlet 24 and forms the intermittently operated secondary fuel circulation circuit.

As mentioned above, the fuel stagnating in the annular channel 20 of the injector 10 arm 12 may undergo coking because of the high temperature resulting from the heat radiation of the combustion flame, leading to a poor circulation of the fuel in the secondary circuit.

The invention solves this problem by circulating the fuel from the primary circuit into the annular channel 20 of the injector 10 arm 12 and the fuel from the secondary circuit into the central channel 18 of the injector 10 arm 12. Thus, in the injector 10 arm 12, the fuel of the primary circuit protects the stagnating fuel in the secondary circuit and prevents the formation of coke, thus ensuring an optimal operation of the injector 10 according to the invention.

For this purpose, the injector 10 according to the invention comprises an annular body 26 which is made in a single piece. This body 26 comprises two central upstream 28 and downstream 30 openings. The upstream opening 28 consists of a tubular portion projecting upstream from a radial annular face 32 of a downstream annular portion 34 of the annular body 26. The downstream opening 30 of the downstream portion 34 of the annular body 26 consists of a tubular passage or a recess. The tubular portion 28 and the tubular passage 30 are coaxially formed and extend along the X axis of the annular body 26.

Figure 2:
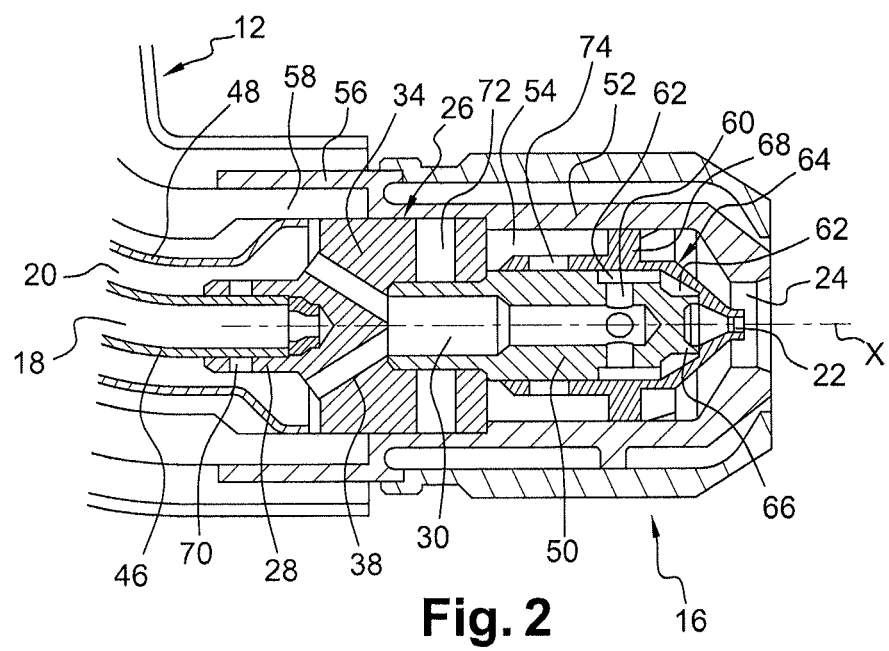
FIG. 2 is a schematic view on a larger scale of the area defined by dotted lines in FIG. 1 and more specifically showing reverse fuel circulation ducts according to the invention.
Figure 3:
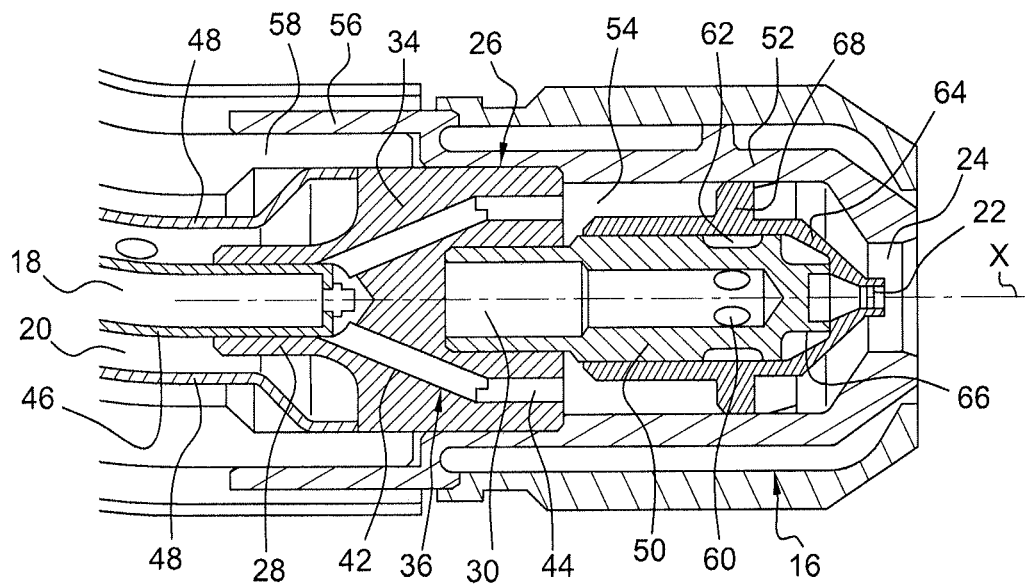
FIG. 3 is a schematic view similar to that of FIG. 2 according to an angularly offset section plane with respect to the FIG. 2 section plane so as to show reverse fuel circulation ducts.

The downstream annular portion 34 of the annular body 26 includes first 36 and second 38 ducts (FIGS. 2 and 3). The first ducts 36, which preferably converge downstream toward the X axis, open at their upstream ends into the tubular portion 28 and at their downstream ends at a downstream radial annular face 40 of the downstream portion 34 of the annular body which surrounds the downstream outlet of the tubular passage 30. These first ducts 36 comprise upstream portions 42 which diverge relative to each other in the downstream direction and downstream portions 44 which extend substantially along the axis X. The second ducts 38 open at their upstream ends at the upstream radial annular face 32 of the annular downstream portion 34 of the annular body 26 and at their downstream ends into the tubular passage 30 of the downstream portion 34.

Figure 4:
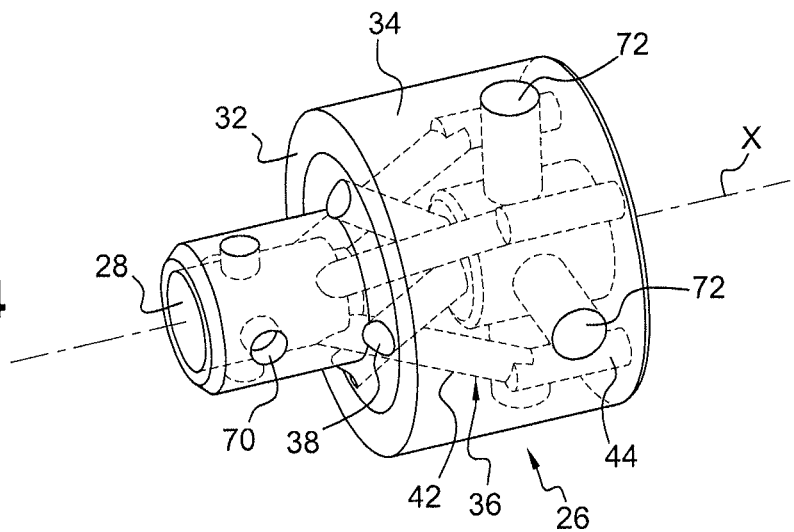
FIG. 4 is a schematic perspective view from upstream of the body accommodating the reverse fuel circulation ducts.
Figure 5:
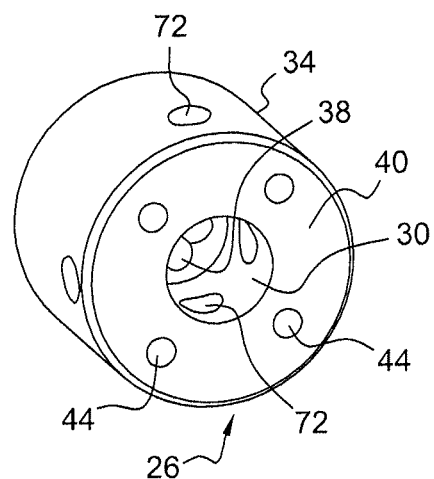
FIG. 5 is a schematic perspective view from downstream of the body accommodating the reverse fuel circulation ducts.

As shown in FIGS. 4 and 5, the first 36 and second 38 ducts are alternately arranged about the X axis. In the example shown, the annular body 26 comprises first 36 four and second 38 four ducts.

The annular body 26 is mounted at the junction of the downstream end of the arm 12 and the downstream head 16 of the injector 10 so that the upstream tubular portion 28 of the annular body 34 engages around the downstream end of the tube 46 defining the central channel 18. The downstream end 48 of the tube delimiting the annular channel 20 of the arm 12 is widened and is aligned with the external periphery of the downstream portion 34 of the annular body 26.

The head 16 of the injector 10 comprises two internal 50 and external 52 annular tips defining therebetween an annular channel 54 into which the downstream ends of the first ducts 36 open. The upstream end portion of the internal annular tip 50 is sealingly inserted into the tubular passage 30 into which the downstream ends of the second ducts 38 open. The upstream end portion of the external annular tip 52 surrounds the downstream external periphery of the downstream portion 34 of the annular body 26. The external annular tip 52 comprises at its upstream end an annular rim 56 surrounding a sleeve 58 the downstream end of which is engaged around the downstream portion 34 of the tubular body 26.

The internal tubular tip 50 comprises through-holes 60 radially opening outwardly into an annular space 62 externally delimited by an intermediate tip 64 inserted between the internal tip 50 and the external tip 52. The downstream end of the intermediate tip 64 comprises a primary annular spin 66 intended to induce a rotation of the fuel of the primary circuit in a manner well known to the persons skilled in the art.

The intermediate tip 64 comprises on its external periphery a secondary spin 68 intended to drive the fuel of the secondary circuit into rotation.

As shown in FIGS. 4 and 5, the tubular portion 28 and the downstream portion 34 of the annular body 26 each comprise four holes 70, 72 evenly distributed around the X axis of the annular body 26. The holes 72 of the downstream portion 34 of the annular body 26 each extend between two consecutive downstream second portions 44 of the first ducts 36 and inwardly open into the tubular passage 30. The holes 70 of the tubular portion 28 open into the interior thereof. When assembling the injector, such holes enable the brazing of the tubular portion 28 on the downstream end of the tube 46 of the central channel 18 of the arm 12. Similarly, the holes 72 of the downstream portion 34 of the cylindrical body 26 enable the brazing of the external periphery of the tubular passage 30 on the upstream end of the internal tip 50.

As shown in FIG. 2, the intermediate tip 64 also has through-holes 74 for the brazing thereof on the internal tip 50.

The invention claimed is:

1. A fuel injector, comprising a downstream head having a central outlet and an annular peripheral outlet surrounding the central outlet, and art injector arm upstream of the head comprising a coaxial central channel and an annular channel, wherein the central channel is in fluid communication with the peripheral outlet and the annular channel is in fluid communication with the central outlet, with downstream ends of the central channel and the annular channel respectively communicating with at least a first duct communicating downstream with the peripheral outlet and at least a second duct communicating downstream with the central outlet, with said first and second ducts being formed in an annular body arranged at a junction of the head and the arm, a downstream end of the first duct opening into an annular channel of the head of the injector internally and externally delimited by an internal annular coaxial tip and an external annular coaxial tip, with a downstream end of the second duct opening into the internal tip, an upstream end of the internal tip being sealingly inserted into a downstream end of the annular body.

2. The injector according to claim 1, wherein the annular body comprises an upstream central opening communicating an upstream end of the first duct with the downstream end of the central channel of the arm and a downstream central opening communicating the downstream end of the second duct with the internal tip.

3. The injector according to claim 2, wherein the upstream end of the internal tip is sealingly inserted into a tubular passage forming the downstream central opening of the body and in that an upstream end of the external tip sealingly surrounds the downstream end of the annular body.

4. The injector according to claim 2, wherein the upstream central opening of the body is formed by a tubular portion projecting in an upstream direction relative to a downstream annular portion of the body, with the tubular portion being sealingly fitted around or inside a downstream end of a tube forming the central channel of the arm.

5. The injector according to claim 2, further comprising a first plurality of ducts and a second plurality of ducts alternately arranged around an axis passing through the upstream and downstream central openings of the annular body, wherein the first plurality of ducts includes the first duct, and wherein the second plurality of ducts includes the second duct.

6. The injector according to claim 5, wherein the first plurality of ducts extends from the upstream central opening to the downstream end of the annular body, and the second plurality of ducts extends from an upstream end of the annular body to the downstream central opening.

7. The injector according to claim 6, wherein the upstream central opening is formed by a projecting tubular portion and the downstream central opening is formed by a tubular passage of the annular body.

8. A combustion chamber of a turbine engine, comprising the injector according to claim 1.

9. A turbine engine, comprising the combustion chamber according to claim 8.

* * * * *